June 16, 1942.    C. D. RYDER    2,286,383
SPEED FASTENER
Filed June 26, 1941

INVENTOR.
BY Charles D. Ryder
Bogert & Bogert

Patented June 16, 1942

2,286,383

UNITED STATES PATENT OFFICE 2,286,383

SPEED FASTENER

Charles D. Ryder, Covington, Ky., assignor to The National Colortype Company, Bellevue, Ky., a corporation of Kentucky Application June 26, 1941, Serial No. 399,813

9 Claims. (Cl. 85—36)

Fasteners of the general type herein set forth have acquired the trade name of "speed nut." Such a title really applies only in the event a fastener of this class is employed on a threaded element of the character of a bolt or screw. Since the fastener I disclose is one which may be employed as readily with any shaft-like or shank-equipped cooperating fastening element, regardless of whether it is provided with threads or not, I have chosen to apply the term "speed fastener" as it conveys the more correct meaning as to its designed purpose.

An object of my invention is to produce a speed fastener of the type, which may be made of sheet metal, in which the usual yielding or spring-like quality of the metal is overcome by shaping it to produce rigidity so that it is non-yielding in the fastening operation and in which the strength approximating that of a fastener of solid metal or usual nut-like type is obtained.

A further object is to produce such a sheet metal fastener as eliminates the spring-like character of the metal in its function of fastening the elements together, but which is so constructed as to employ the inherent resiliency of the metal for the sole purpose of mounting the fastener in position on the shanked fastening element preliminary to the fastening or securing operation.

A further object is to produce a sheet metal fastener which may be made with the fewest possible steps, with the use of the smallest amount of metal, with the simplest of forming dies, and without the necessity of resorting to special cutting, shaping and tempering operations of the type usually employed in the manufacture of fasteners of the general type to which this fastener is related.

An additional object is to produce a sheet metal fastener of the type described, in which the principle of its operation is that of a toggle and in which the structure is basically one of rigid or non-yielding wedges so connected that they cooperate to grip the shank of a bolt, screw, rivet or the like in holding two or more elements in fixed relationship to each other.

These and other objects are attained in the fastener about to be described and which I have illustrated in the accompanying drawing, in which.

Figure 1:
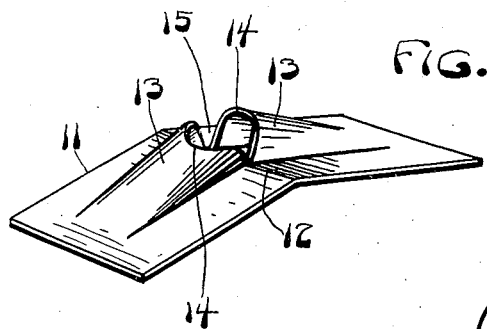
Fig. 1 is a perspective view of a fastener embodying my invention.

A speed fastener of the type shown in Fig. 1 is of rectangular form and of sheet metal, the rectangular base 11 being bent transversely as at 12 to constitute a substantial wide angle arch or V-shape. Each portion of the V-arch is equipped with an arched rib 13, the form of which in this example, provides for their open ends 14 facing each other but spaced apart to receive the shank, threaded or otherwise, of a corresponding screw, bolt, rivet or the like. These open ends preferably are shaped substantially to embrace the shank, whereby gripping thereof by the fastener's rib ends 14 will be complete and effective substantially for its entire circumference.

Figure 6:
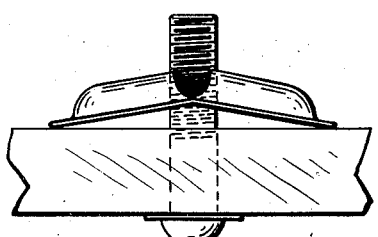

Since the fastener ribs are rigid because of their shaping, their action in gripping the screw or bolt shank affords no yielding thereof as in the type of spring fingered speed nut now commonly in use, these ribbed portions of the base 11 being connected across the transverse bend 12 of the fastener. Because of the arch shape of the base, and because the opening between the ribs is designed to grip the shank wall, the metal of bend 12 preferably is such that a slightly less initial width of opening 15 is given, preferably for the simple function of fastener placement or positioning on the mounting shank merely for the purpose of holding it in place for the actual fastening or tightening operations. The moment such tightening or fastening operation is started the slight inherent yield or springiness in the metal of the base bend 12 ceases in its function as such, and becomes a link or connection as it were, whereby the two wedge-like ribs become connected at their bases so that their end surfaces tend to move toward each other in increasingly tight gripping action, thereby acting in a toggle-like manner to grip the shank tighter and tighter as the screw or bolt is rotated to cause the thread to pull the fastener into tighter and tighter relationship with the elements which are being connected. Reference to Fig. 6 will make such an operation obvious. In the event of a relatively smooth shanked element, as the rivet 16 in Fig. 4, mere opposing pressure on the rivet and fastener, whereby they are forced toward each other in metal-biting or gripping relationship, will perform the fastening operation, the functioning of which result depends, as has been explained, on the unique action of my novel toggle-like speed fastener.

Figure 2:
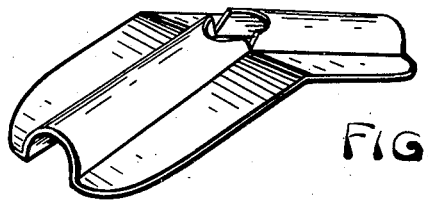
Fig. 2 is a perspective view of another form of fastener embodying my invention.

Fig. 2 is a modification of the fastener shown in Fig. 1, in that the ribs are carried throughout the length of the fastener and are of slightly different cross sectional shape. Additionally, the corners of the base have been rounded, which is of possible advantage in the avoidance of sharp corners and contributing to the ease of handling.

Figure 3:
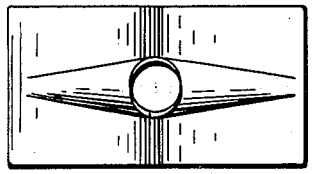
Figs. 3 and 4 are respective plan and side views of a fastener embodying further modification of my invention.
Figure 4:
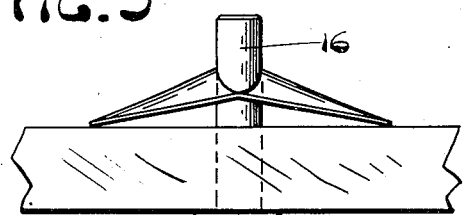

Figs. 3 and 4 show a fastener of rectangular shape, but in which the rib formation has been modified to tapering shape.

Figure 5:
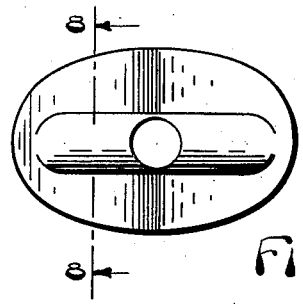
Figs. 5 and 6 are respective plan and side views of an additionally modified form of my invention.

Figs. 5 and 6 disclose further modification of my improved fastener in that the base is made elliptical and the rib form has been altered slightly.

Figure 7:
Figs. 7 and 8 are transverse sectional views, such as might be exemplified by line 8—8 of Fig. 5, showing typical rib shape modifications, as will be described.
Figure 8:

Figs. 7 and 8 merely suggest possible modifications of the rib shapes, which, together with base and other possible variations in detail, in no manner involve departures from the spirit and scope of the invention I have illustrated and described as above, and which is set forth in the following claims.

I claim:

1. In a speed fastener, the combination of a toggle nut comprising a V-shaped spring plate with a central longitudinal rib having an opening at the apex of the V, and a fastening element extending through said opening engaged by the edges of the rib forming the opening, whereby the withdrawal movement of the fastening element will cause the said edges to grip the fastening element tighter and tighter.

2. In a speed fastener, the combination of a toggle nut comprising a V-shaped spring plate with a central longitudinal rib having an opening at the apex of the V, said plate being formed of flat surfaces, except for said rib, meeting at the apex of the V, and a fastening element extending through said opening engaged by the edges of the rib forming the opening, whereby the withdrawal movement of the fastening element will cause the said edges to grip the fastening element tighter and tighter.

3. In a speed fastener comprising a one-piece V-shaped spring plate with a central longitudinal rib having an opening at the apex of the V, for the insertion of a fastening element in said opening and whereby the edges of the rib forming the opening will grip the fastening element tighter and tighter upon withdrawal movement of the fastening element.

4. In a speed fastener, the combination of a toggle nut comprising a V-shaped spring plate with a central longitudinal rib of curved cross-section, having an opening at the apex of the V, and a fastening element extending through said opening engaged by the edges of the rib forming the opening, whereby the withdrawal movement of the fastening element will cause the said edges to grip the fastening element tighter and tighter.

5. In a speed fastener, the combination of a toggle nut comprising a V-shaped spring plate with a central longitudinal rib, of square cross-section, having an opening at the apex of the V, and a fastening element extending through said opening engaged by the edges of the rib forming the opening, whereby the withdrawal movement of the fastening element will cause the said edges to grip the fastener element tighter and tighter.

6. In a speed fastener, the combination of a toggle nut comprising a V-shaped spring plate with central longitudinal ribs, said ribs being of increasing taper toward said opening, having an opening at the apex of the V, and a fastening element extending through said opening engaged by the edges of the rib forming the opening, whereby the withdrawal movement of the fastening element will cause the said edges to grip the fastening element tighter and tighter.

7. In a speed fastener, the combination of a toggle nut comprising a V-shaped spring plate with a central longitudinal rib having an opening at the apex of the V, and a fastening element extending through said opening engaged by the edges of the rib forming the opening, whereby the withdrawal movement of the fastening element will cause the said edges to grip the fastening element tighter and tighter, said nut being formed of a single piece of resilient material bent transversely of the longitudinal center.

8. In a speed fastener, the combination of a toggle nut comprising a V-shaped spring plate, with a central longitudinal rib having an opening at the apex of the V, and a fastening element extending through said opening engaged by the edges of the rib forming the opening, whereby the withdrawal movement of the fastening element will cause the said edges to grip the fastening element tighter and tighter, the side edges of the ribs being integral with the base.

9. In a speed fastener, the combination of a toggle nut comprising a V-shaped spring plate, with a central longitudinal rib having an opening at the apex of the V, and a fastening element extending through said opening engaged by the edges of the rib forming the opening, whereby the withdrawal movement of the fastening element will cause the said edges to grip the fastening element tighter and tighter, the said nut being adapted to rest upon a base on its opposite end edges only.

CHARLES D. RYDER.